(12) United States Patent
Marlow et al.

(10) Patent No.: US 8,358,482 B2
(45) Date of Patent: *Jan. 22, 2013

(54) HARD DISC DRIVE COUNTER-VIBRATION SYSTEM

(75) Inventors: Stewart P. Marlow, Bradford (GB); Christopher Lockwood, Halifax (GB)

(73) Assignee: Eldon Technology Limited, Steeton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,357

(22) Filed: Sep. 26, 2011

(65) Prior Publication Data

US 2012/0012730 A1 Jan. 19, 2012

Related U.S. Application Data

(63) Continuation of application No. 12/345,418, filed on Dec. 29, 2008, now Pat. No. 8,035,916.

(60) Provisional application No. 61/116,155, filed on Nov. 19, 2008.

(51) Int. Cl.
*G11B 17/00* (2006.01)

(52) U.S. Cl. ........... 360/97.02; 361/679.34; 361/379.35; 361/807; 361/685; 361/638

(58) Field of Classification Search ............. 360/97.02; 361/679.34, 679.35, 807, 685, 638
See application file for complete search history.

(56) References Cited

U.S. PATENT DOCUMENTS

| | | | |
|---|---|---|---|
| 4,713,714 A | 12/1987 | Gatti et al. | |
| 7,031,150 B2 | 4/2006 | Chen et al. | |
| 7,345,237 B2 * | 3/2008 | Chen et al. | 174/50 |
| 7,477,512 B2 * | 1/2009 | Sung | 361/679.33 |
| 7,489,504 B2 * | 2/2009 | Chen et al. | 361/679.37 |
| 7,523,901 B2 * | 4/2009 | Wu et al. | 248/225.21 |
| 7,639,490 B2 * | 12/2009 | Qin et al. | 361/679.34 |
| 8,035,916 B2 * | 10/2011 | Marlow et al. | 360/97.19 |
| 2004/0210915 A1 | 10/2004 | Law | |
| 2010/0039765 A1 | 2/2010 | Antonuccio et al. | |
| 2010/0123974 A1 | 5/2010 | Marlow et al. | |

FOREIGN PATENT DOCUMENTS

| | | |
|---|---|---|
| DE | 1836485 U | 8/1961 |
| JP | 58 051689 A | 3/1983 |
| JP | 01 178187 A | 7/1989 |
| JP | 05 263872 A | 10/1993 |
| JP | 05 266644 A | 10/1993 |
| JP | 11-037198 | 3/1999 |
| JP | 01 126462 A | 5/2001 |
| JP | 05 180619 A | 7/2005 |
| JP | 2006-153108 | 6/2006 |
| NL | 1018827 C1 | 10/2001 |

OTHER PUBLICATIONS

International Search Report and Written Opinion dated Feb. 2, 2010, PCT/EP2009/065383, 14 pages.
Intellectual Property Office of Singapore, Search Report and Written Opinion of Application No. 201103574-8, dated Apr. 18, 2012, 11 pages.

* cited by examiner

*Primary Examiner* — Connie Yoha
(74) *Attorney, Agent, or Firm* — Kilpatrick Townsend & Stockton LLP

(57) ABSTRACT

One implementation of the present invention may take the form of a system for a hard disc drive counter-vibration device that may absorb rotational vibration or gyration of the hard disc drive module. This mounting device may incorporate at least one soft, plastic sphere and a pair of concave dished surfaces, configured to face each other and maintain the sphere between them. The sphere of the counter-vibration assembly may support the hard disc drive (HDD) while the weight of the HDD may align the dishes with each other and over the sphere. In this manner, the sphere may act as a spring and allow the HDD to vibrate or gyrate without transmitting the mechanical movement to the rest of the HDD assembly or electronic device.

11 Claims, 6 Drawing Sheets

HARD DISC DRIVE COUNTER-VIBRATION SYSTEM

CROSS-REFERENCE TO RELATED APPLICATIONS

This application is a continuation of U.S. patent application Ser. No. 12/245,418, filed Dec. 29, 2008, entitled "Hard Disc Drive Counter-Vibration System," which application claims priority to U.S. Provisional Application No. 61/116,155, filed Nov. 19, 2008, entitled "Hard Disc Drive Counter-Vibration System," the entireties of which are hereby incorporated by reference.

TECHNICAL FIELD

The present invention relates generally to disc drives storage devices, and more particularly to a storage device counter-vibration system.

BACKGROUND

A hard disc drive (HDD) is a non-volatile storage device which may store digital data. HDDs are most commonly used in personal and laptop computers, as well as other electronic devices, such as digital video recorders (DVRs), cell phones, personal digital assistants, digital cameras, home video game consoles and digital audio devices. These devices utilize the HDD to store and retrieve digital information during operation of the devices. Generally, the HDD of an electronic device is contained within the device for ease of use and access to the digital information.

To access or store digital information, the HDD may read or write to a rotating magnetic platter using an HDD head. However, many HDDs have an imperfect platter balance, resulting in a rotational vibration or gyration in the HDD as the platter spins. For example, an imbalanced platter assembly spinning at 5400 rotations per minute (rpm) may cause a rotational vibration or gyration of the HDD unit at 90 hertz (Hz). Similarly, an imbalanced assembly spinning at 7200 rpm may vibrate the HDD unit at 120 Hz. This mechanical movement may be transferred through the case of the HDD to the electronic device itself, resulting in a vibration-induced noise associated with the device. For electronic devices intended for noiseless or quiet environments, such as a set-top box of a television system, the vibration or gyration of the HDD within the electronic device may produce an unintended acoustic annoyance.

To counteract the vibration or gyration of an imbalanced HDD module, manufacturers have developed techniques in an attempt to absorb the rotational vibration or gyration of an imbalanced HDD module. One common solution places a series of soft grommets between the HDD and a mounting bracket to absorb vibration or gyration and prevent it from being transferred to the device chassis. However, the extreme softness of grommets capable of absorbing 90-120 Hz makes them vulnerable to damage if the HDD is ever dropped or knocked. Thus, what is needed is a method and system for absorbing rotational vibration of an imbalanced platter assembly of a HDD module that allows for more durability during movement of the device.

BRIEF SUMMARY

One implementation of the present invention may take the form of

DETAILED DESCRIPTION

One implementation of the present invention may take the form of a system for a storage device counter-vibration device that may absorb rotational vibration or gyration of the hard disc drive module or other storage device. This mounting device may incorporate at least one soft, plastic sphere and a pair of concave dished surfaces, configured to face each other and maintain the sphere between them. The sphere of the counter-vibration assembly may support the hard disc drive (HDD) while the weight of the HDD may align the dishes with each other and over the sphere. In this manner, the sphere may act as a spring and allow the HDD to vibrate or gyrate thus minimizing the physical movement transmittance to the rest of the HDD assembly or electronic device. While the examples and figures below describe a counter-vibration mechanism in relation to a HDD, it should be appreciated that the described embodiments may provide vibration absorption for any data storage device that may vibrate or gyrate during operation.

Figure 1:
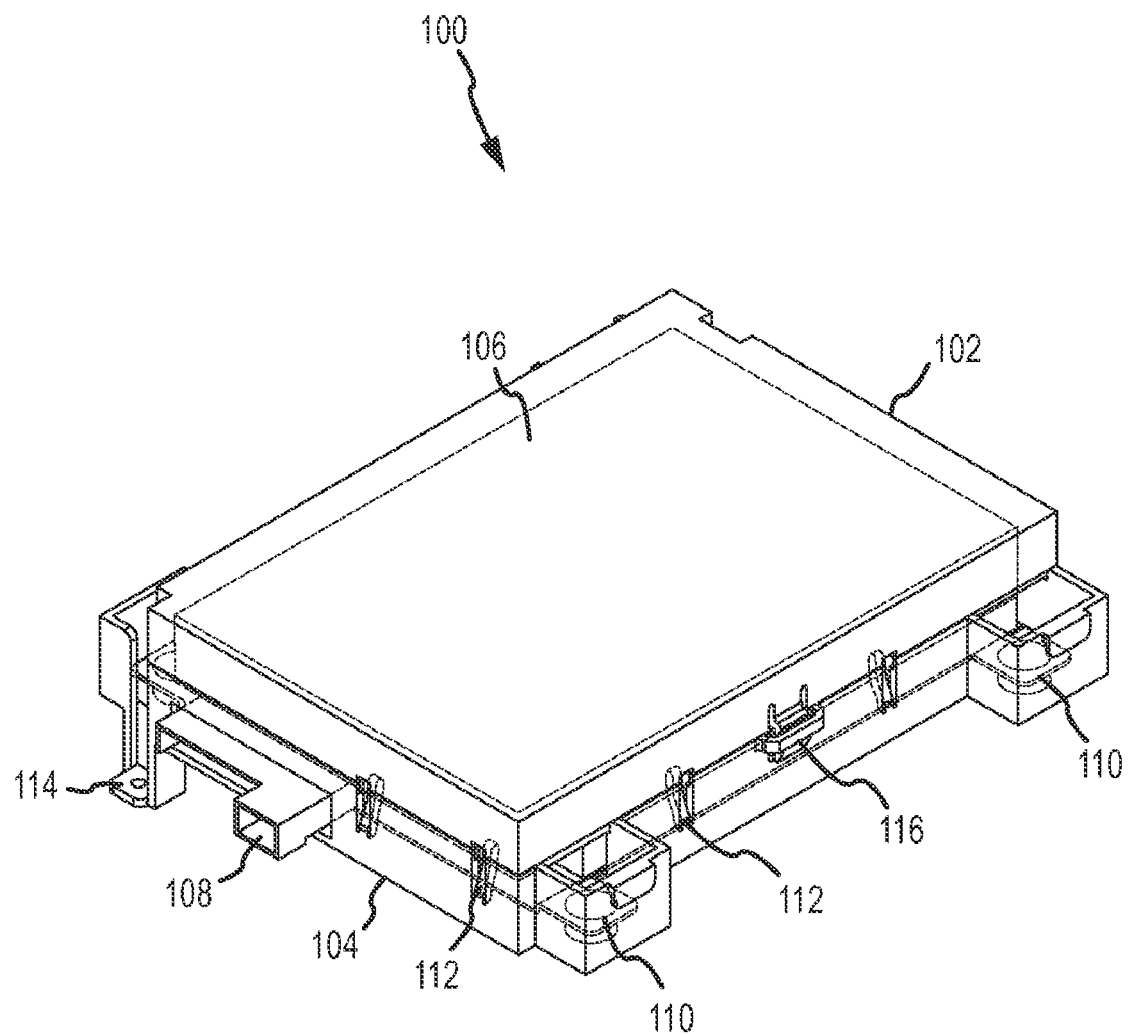
FIG. 1 depicts an isometric view of an embodiment of a hard drive disc housing assembly including a counter-vibration mounting assembly incorporating spheres.

FIG. 1 depicts an isometric view of an embodiment of a hard drive disc housing assembly including a counter-vibration mounting system incorporating spheres. The housing assembly may encase an HDD and include at least one sphere and concave surface to absorb the rotational vibration or gyration of the HDD module. Further, the housing assembly may also include bumper features to protect the HDD from damage if the assembly is dropped or knocked. Such a structure may also act as a barrier to direct acoustic noise generated by the HDD.

The housing assembly 100 of FIG. 1 may include a mounting bracket 104 and an HDD cover 102, such that the mounting bracket and HDD cover may form a box-like structure to house and encase an HDD 106. The HDD cover 102 and mounting bracket 104 may be constructed of any material that may support and protect the HDD 106. For example, the HDD cover 102 and mounting bracket 104 may be constructed from a rigid plastic or sheet metal.

Further, the HDD cover 102 may attach to, or otherwise be associated with, the mounting bracket 104 and thereby encase the HDD 106 within the box-like structure. For example, the HDD cover 102 may include a snap or other similar structure to secure the HDD cover to the mounting bracket 104. In the particular implementation set forth herein, the housing assembly 100 contains at least one tab and slot snap assembly 116, with the HDD cover 102 containing a tab that engages a slot located on the mounting bracket 104 such that the tab is locked in place when engaged. The housing assembly 100 may include any number of snap assemblies 116 to hold the HDD cover 102 and the mounting bracket 104 together. Further, it should be appreciated that any device that holds the HDD cover 102 to the mounting bracket 104 may be implemented with the embodiments described herein.

When the HDD cover 102 and mounting bracket 104 are engaged, the HDD 106 may be contained within the housing assembly 100. To read from and write to the memory device, an interface opening 108 may be included in the housing assembly 100. The interface opening 108 may provide access into the box-like structure created by the HDD cover 102 and mounting bracket 104 through which the HDD 106 may be accessed. For example, a communication cable may be connected to the HDD 106 through the opening 108 such that the electronic device accessing the HDD may communicate with the drive. For example, a Small Computer System Interface (SCSI), Enhanced Small Disk Interface (ESDI), Advanced Technology Attachment (ATA) or similar cable may be connected to the HDD 106 for communication with the drive. This cable may pass through the box-like structure created by the HDD cover 102 and mounting bracket 104 through the interface opening 108.

As mentioned above, HDDs may be incorporated within an electronic device to store digital data accessed or utilized by the device. To facilitate such incorporation, the housing assembly 100 may be mounted within the electronic device using mounting posts 114 included with the mounting bracket 104. For example, a screw may pass through the mounting post 114 and attach to the electronic device to secure the housing assembly 100 thereto. Generally, the mounting bracket 104 may take any form that facilitates the inclusion of the HDD 106 within an electronic device. For example, the mounting bracket 104 may have mounting posts 114 of varying size to fit the electronic device. Other examples may not utilize mounting posts at all. In other embodiments, the HDD 106 may be separate from an electronic device. In these embodiments, the mounting bracket 104 may take any form that houses the HDD 106, for example, within a durable box-like structure to protect the HDD within.

As explained in more detail below, the housing assembly 100 may include at one or more counter-vibration assemblies 110. The counter-vibration assemblies may include at least one sphere and a pair of concave dished surfaces, configured to face each other and maintain the sphere between them. The physical dimensions and characteristics of the dished surfaces and the sphere may be dependent on the physical characteristics of the housing assembly 100. The upper dish may be associated with the HDD 106 through a mounting frame while the lower dish may be associated with the mounting bracket 104. In this manner, the HDD 106 coupled to the mounting bracket 104 may be supported by the sphere located between the upper dish and the lower dish. The housing assembly 100 may also include several bumpers 112 located along the outer edge of the housing assembly. As further explained below, the bumpers 112 may prevent the HDD 106 from impacting the side walls of the box-like structure when the assembly is dropped or knocked.

Figure 2:
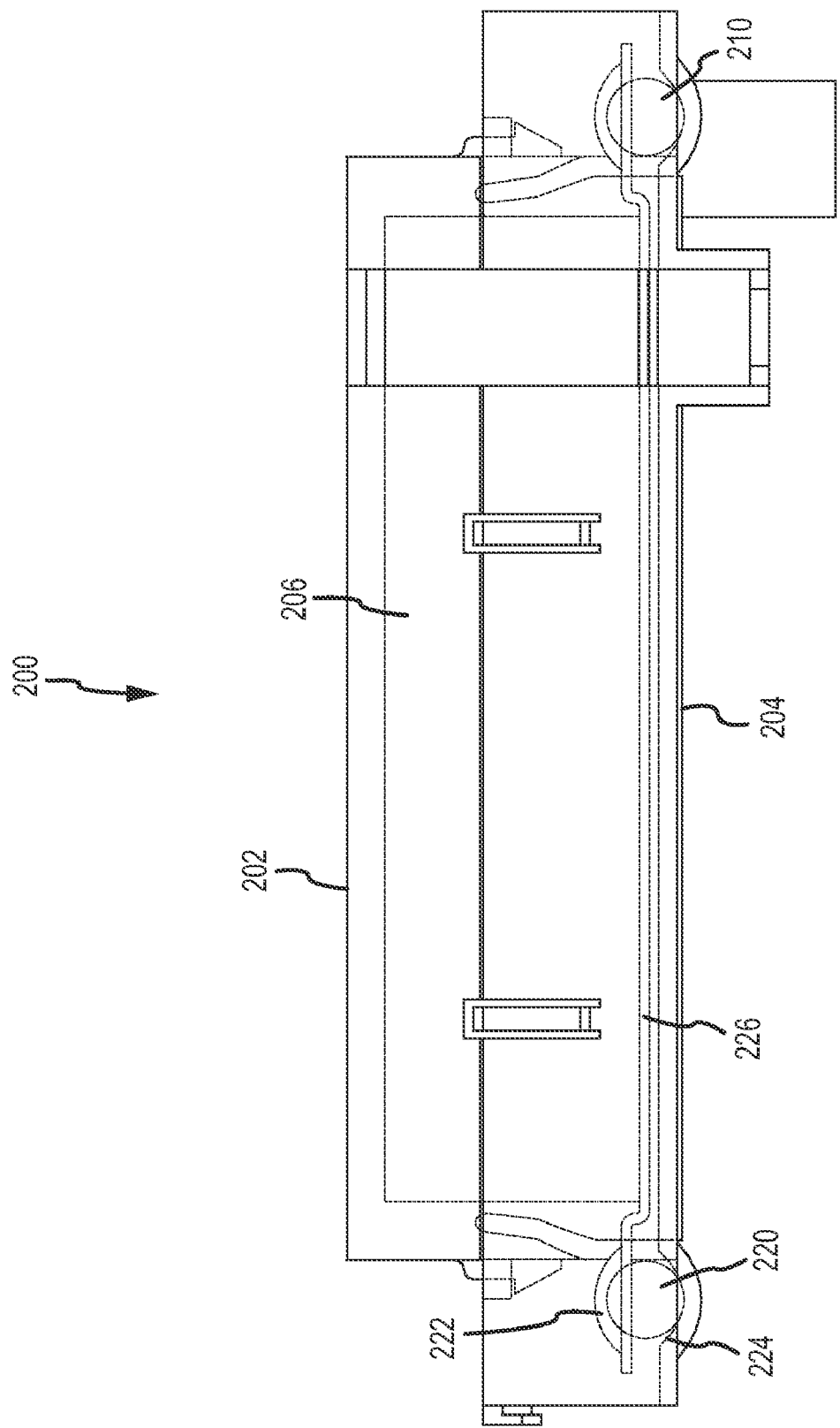
FIG. 2 depicts a front view of the embodiment FIG. 1.

FIG. 2 depicts a front view of an embodiment of a hard drive disc housing assembly including a counter-vibration mounting system incorporating one or more spheres. The housing assembly shown in FIG. 2 is similar to the housing assembly shown in FIG. 1. This view, however, depicts the counter-vibration mounting assembly in more detail.

Similar to FIG. 1, the housing assembly 200 shown in this figure may include an HDD cover 202 and a mounting bracket 204 encasing an HDD 206. As explained above, the mounting bracket 204 may mount the housing assembly 200 to an electronic device. The electronic device may then access the HDD 206 encased within the housing assembly 200 to store and read digital information during operation of the device.

The housing assembly 200 may also include one or more counter-vibration assemblies 210 to absorb the rotational vibration or gyration of the HDD module 206 during operation. The counter-vibration assemblies 210 may include a sphere 220 to at least partially absorb the rotational vibration or gyration of the HDD module 206 and thus reduce transfer of the mechanical movement to the mounting bracket 204. To absorb the vibration or gyration of the HDD module 206, the sphere 220 may be constructed of a vibration absorption material, such as a soft silicone-free elastomer gel material. Further, the sphere 220 of the counter-vibration assembly 210 may be rigid enough to support the weight of the mounting frame 226 and HDD 206 such that the HDD does not contact or rest on the mounting bracket 204, but rather the sphere 220 itself. Generally, however, the sphere 220 may be constructed from any soft material that may absorb vibration or gyration caused by the HDD module 206 while also preventing the HDD 206 from contact with the rest of the housing assembly 200.

The one or more counter-vibration assemblies 210 may also include an upper dish 222 and a lower dish 224 defining two concave surfaces. The upper dish 222 and the lower dish 224 may be configured to face each other, such that the center of each concave surface is axially aligned when the counter-vibration assemblies 210 are in an opposing and inverted position. Further, the sphere 220 of the counter-vibration assembly 210 may be placed between the upper dish 222 and the lower dish 224 such that the dish assemblies hold the sphere 220 between, or within, the concave surfaces. As explained in more detail below, the interaction of the sphere 220 and the two dish surfaces provide support for the HDD 206 while allowing lateral rotational or gyrational movement of the HDD during operation, without significant mechanical transmission.

As shown in FIG. 2, the lower dish 224 surface may be attached to or otherwise associated with the mounting bracket 204 of the housing assembly 200. Further, the sphere 220 may be located within the concave surface of the lower dish 224 of the mounting bracket 204. Generally, the force of gravity acting on the sphere will centralize the sphere 220 in the middle of the lower dish 224. The upper dish 222 surface of the counter-vibration assemblies 210 may be attached or otherwise associated with a mounting frame 226. The upper dish 222, and thus the mounting frame 226, may rest on top of the sphere 220, opposite the lower dish 224, such that the sphere may be rest between the two concave surfaces of the dishes. Thus, in this configuration, the mounting frame 226 may be fully supported within the housing assembly 200 by the sphere 220. Further, as described in more detail below, several sphere and dish assemblies may be included such that the mounting frame 226 is supported at several points by the several sphere and dish assemblies.

The HDD 206 may be mounted on one side of the mounting frame 226 such that the mounting frame 226 is coupled to the HDD. For example, the HDD 206 may be attached to the mounting frame 226 using screws, an adhesive, or other suitable attachments. Once attached to the mounting frame 226, the HDD may be fully supported by the spheres of the one or more counter-vibration assemblies 210 of the housing assembly 200. As explained in more detail below, in this configuration some or all rotational vibration or gyration generated by the HDD module 206 during operation may be transferred to the counter-vibration assemblies 210.

When the HDD 206 is coupled to the mounting frame 226, any rotational vibration or gyration of the HDD module 206 may be transferred to the mounting frame, including the upper dish 222 surface of the counter-vibration assembly 210. Thus, as the HDD 206 vibrates or gyrates, the mounting frame 226 and upper dish 222 associated with the mounting frame may move with the HDD, predominantly in a lateral movement. The movement of the upper dish 222 upon the sphere 220 may cause the sphere to rotate hence depress within the counter-vibration assembly. However, the weight of the HDD 206 and the shape of the dish surfaces may exert sufficient force on the sphere 220 to recenter the sphere within the upper and lower dish surfaces. Thus, the sphere 220 may act in a manner similar to a spring assembly to absorb lateral movement of the HDD 206 and mounting frame 226 and return the sphere back to the center location of the dish surfaces. Further, the general softness of the sphere 220 may absorb a portion of the vertical movement of the HDD due to the rotational vibration or gyration of the HDD. In this manner, the counter-vibration assembly 210 may facilitate lateral and vertical movement of the HDD 206 due to the rotational vibration of an imbalanced platter without transferring the mechanical movement to the rest of the housing assembly.

Generally, the radius of the sphere 220 and the upper and lower dish surfaces may vary with physical characteristics of the embodiment, such as the weight of the HDD 206 and the rigidity of the sphere 220. In one example, the radius of the sphere may be 8 mm while the radius of the upper and lower dish surfaces may be 12 mm. These dimensions of the sphere 220 and the upper and lower dish surfaces provide one example of dimensions that may allow the HDD 206 to move laterally in response to the rotational vibration or gyration of the HDD module while adequately supporting the HDD from coming into contact with the rest of the housing assembly 200 during vibration.

Figure 3:
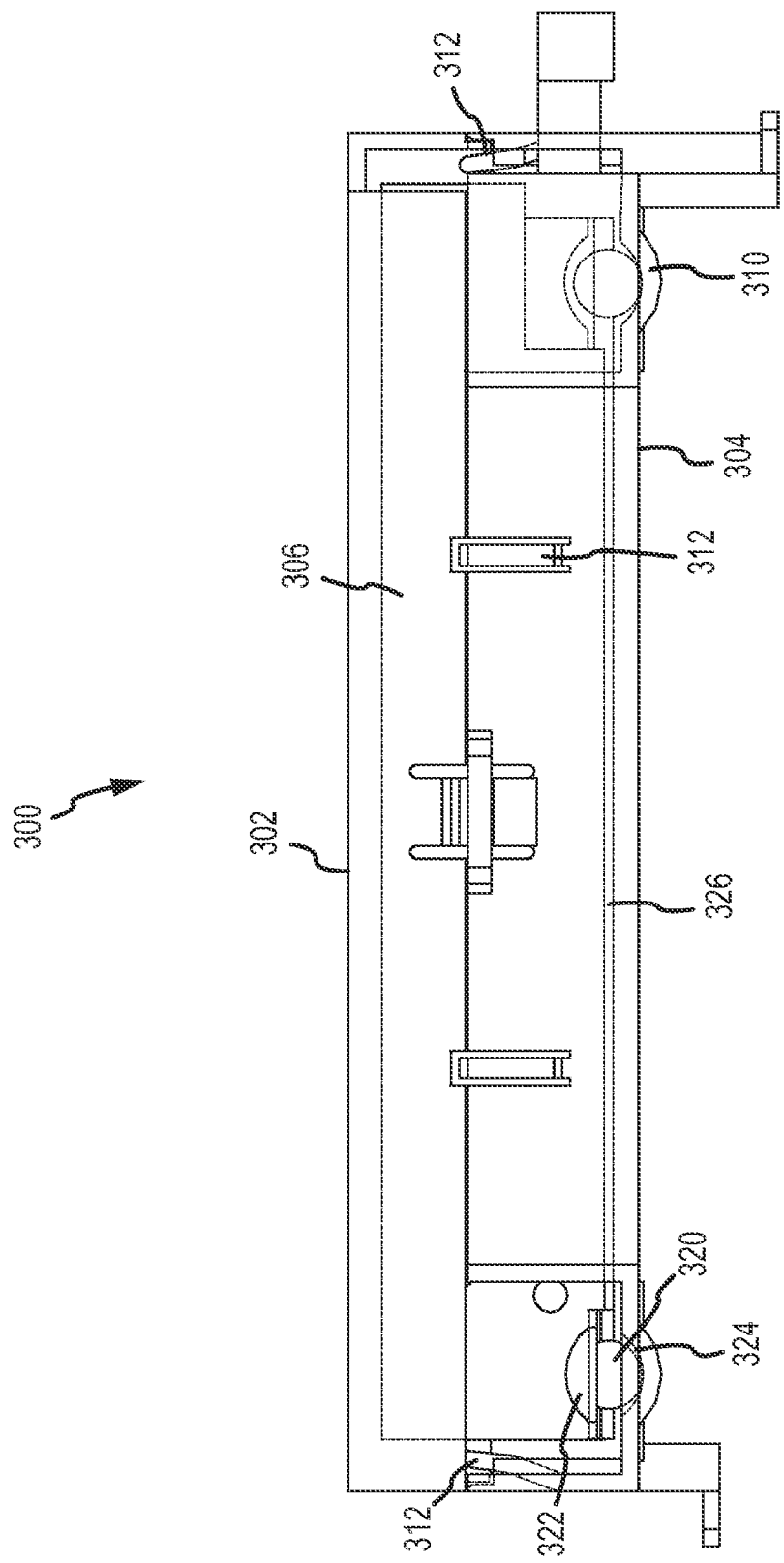
FIG. 3 depicts a side view of the embodiment FIG. 1.

FIG. 3 depicts a side view of an embodiment of a hard drive disc housing assembly including a counter-vibration mounting assembly incorporating spheres. The housing assembly 300 shown in FIG. 3 is similar to the housing assemblies shown in FIGS. 1 and 2. Thus, the housing assembly 300 may include an HDD cover 302 and a mounting bracket 304 encasing an HDD 306. Further, the housing assembly 300 may include one or more sphere and dish surface counter-vibration assemblies as explained above with reference to FIG. 2.

In addition to the features explained above, the housing assembly may also include one or more bumper 312 devices configured to cushion the HDD 306 in the event that the housing assembly 300 is dropped or knocked. For example, as explained above, the HDD 306 and mounting frame 326 may be fully supported by the spheres 320 of the counter-vibration assembly. Thus, the HDD 306 may not be in contact with any other part of the housing assembly, essentially creating a clearance space between the HDD and the rest of the housing assembly 300. This clearance space may provide room for the HDD 306 to vibrate or gyration within the housing assembly 300 without transferring the mechanical movement to the housing assembly. However, a bumper 312 device may be implemented within the box-like housing to cushion the HDD 306 from impacting the sides or top of the housing assembly 300, thereby possibly damaging the HDD.

In one embodiment, the bumper device 312 may include one or more protrusions extending into the box-like interior of the housing assembly 300. The protrusions 312 may be biased such that they act as springs when compressed from the inside of the housing assembly. For example, the bumper 312 of FIG. 3 may be a small, rectangular protrusion attached to or otherwise associated with the mounting bracket 304. The protrusion 312 may be attached to the mounting bracket 304 at one end and biased such that when pressed from the inside of the housing assembly, the protrusion may exert a counter-force against the pressure. Thus, if the HDD 306 within the housing assembly were to press against the protrusion 312, the bumper may cushion the force with which the HDD may exert on the side of the housing assembly 300. This cushion may protect the HDD 306 from violently impacting the interior of the housing assembly 300 box. Further, several protrusions 312 may be located on each side and on the top of the box-like interior of the housing assembly to protect the HDD 306 from every direction.

Other bumper devices may also be used with the described implementations. For example, metal springs may be used to cushion the HDD 306 from impacting the interior of the housing assembly. Other implementations may take the form of, but are not limited to, a protective cover placed over the HDD 306 itself, a set of rubber stoppers and a foam padding placed on the inside surface of the housing assembly to cushion any impact. Generally, any device that may cushion the impact between the HDD 306 and the inside surfaces of the housing assembly when the device is dropped or knocked may be used with the present implementations.

Figure 4:
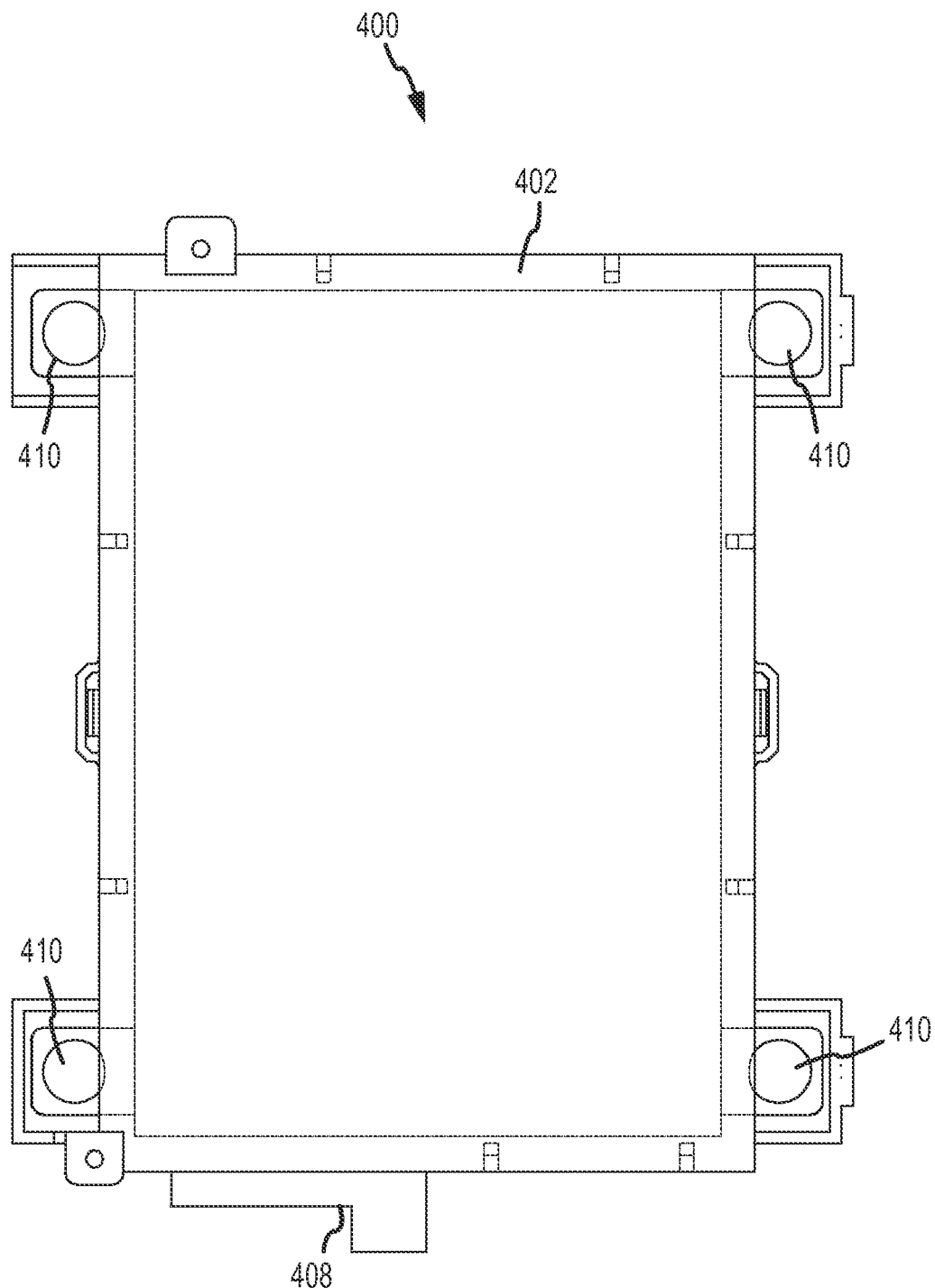
FIG. 4 depicts a top view of the embodiment FIG. 1.

FIG. 4 depicts a top view of an embodiment of a hard drive disc housing assembly including a counter-vibration mounting system incorporating spheres. The housing assembly shown in FIG. 4 is similar to the housing assembly shown in FIGS. 1 through 3.

The embodiment shown in FIG. 4 may include a HDD cover 402 as part of the HDD housing assembly 400 and an interface opening 408 as described above with reference to FIG. 1. Further, this embodiment may include four counter-vibration assemblies 410 to support an HDD and absorb the rotational vibration or gyration caused by an imbalanced platter of the HDD.

The four counter-vibration assemblies 410 of the embodiment may be placed on the corners of the housing assembly 400 on each side, or otherwise positioned as necessary. Thus, the HDD may be fully supported by the spheres of the counter-vibration assemblies 410 at each corner of the HDD device. The support and vibration absorption may be provided by the counter-vibration assemblies 410 in a similar manner as described above with reference to FIG. 2.

It should be appreciated that the different embodiments of the housing assembly 400 may include any number of counter-vibration assemblies 410 to support and absorb rotational vibration or gyration from the HDD. For example, one embodiment may include eight counter-vibration assemblies 410, one on each corner and one on each side of the HDD. In another embodiment, only one counter-vibration assembly 410 may be included, with the HDD resting on the counter-vibration assembly such that the assembly may absorb the HDD vibration or gyration.

Figure 5:
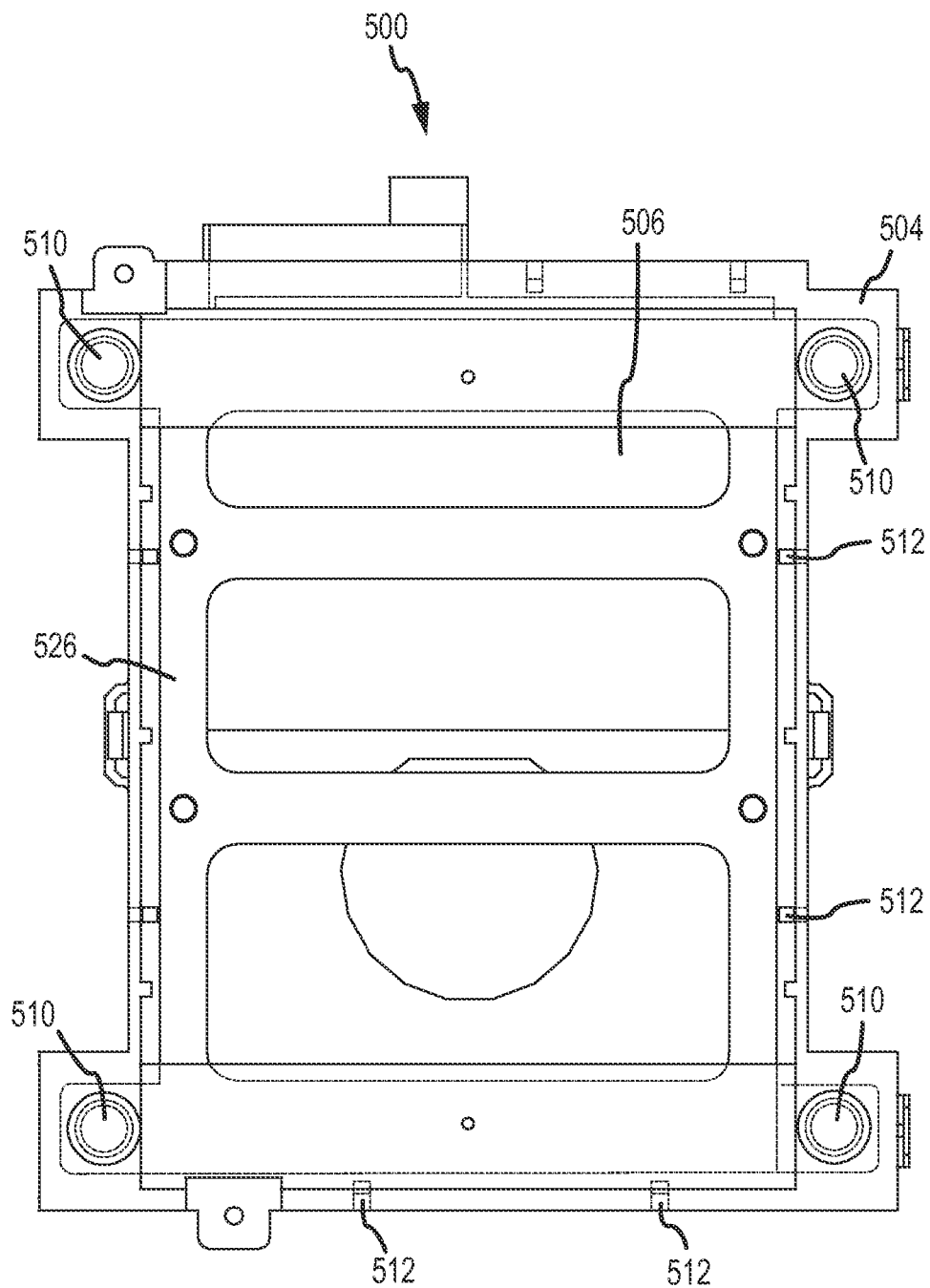
FIG. 5 depicts a bottom view of the embodiment FIG. 1.

FIG. 5 depicts a bottom view of an embodiment of a hard drive disc housing assembly including a counter-vibration mounting system incorporating spheres. The housing assembly 500 shown in FIG. 5 is similar to the housing assembly shown in FIGS. 1 through 4.

The embodiment shown in FIG. 5 may include a mounting bracket 504 including four counter-vibration assemblies 510 located at the corners of the housing assembly 500. An HDD 506 may be attached or otherwise associated with a mounting frame 526. The mounting frame 526 may also include an upper dish surface while the mounting bracket 504 may include a lower dish surface as described above with reference to FIG. 2. Further, the mounting frame 526 and HDD 506 may be supported by a sphere of the counter-vibration assemblies 510 such that the sphere may absorb the vibration or gyration caused by the HDD module during operation. Further, several bumper devices 512 may protrude into the clearance space between the HDD 506 and the inside surface of the housing assembly. The bumper devices may cushion the HDD 506 from coming into contact with the housing assembly as described above with reference to FIG. 3. Each of the features shown in FIG. 5 may be similar to the features described above with reference to FIGS. 1-4.

Figure 6:
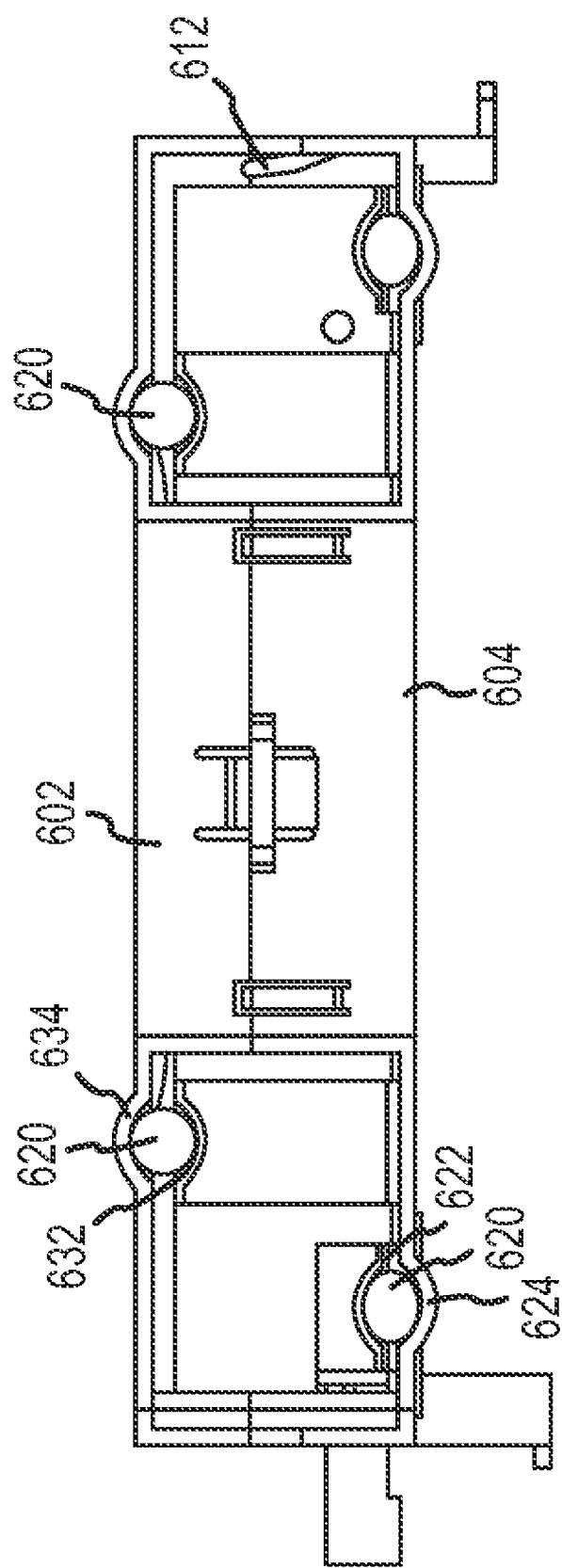
FIG. 6 depicts a side view of a second embodiment of a hard drive disc housing assembly including a counter-vibration mounting assembly incorporating spheres located above and below the hard drive disc.

FIG. 6 depicts a side view of a second embodiment of a hard drive disc housing assembly including a counter-vibration mounting assembly incorporating spheres located above and below the hard disc drive. The counter-vibration assemblies of the embodiment may support the HDD and absorb the rotational vibration or gyration of the HDD module in electronic devices that may operate in several different orientations.

The embodiment of FIG. 6 may include a similar housing assembly as described above, including a HDD cover 602 and a mounting bracket 604 coupled to create a box-like structure to encase an HDD. The embodiment may further include bumpers 612 located within the interior of the box-like structure to cushion the HDD as described above.

The embodiment may also include a lower set of counter-vibration assemblies supporting the bottom of the HDD in a similar manner described above. For example, four counter-vibration assemblies may be located at the corners of the HDD to support the HDD module and absorb the rotational vibrations of the platter or platters. These counter-vibration mounting assemblies may include a sphere 620 located between an upper dish 622 surface and a lower dish surface 624. The upper dish 622 may be coupled to a lower mounting frame which, in turn, may be coupled to the bottom of the HDD. The lower dish 624 may be coupled to the mounting bracket 604 of the housing assembly 600. As described above, the counter-vibration assemblies may support the HDD when the HDD is in an upright position and absorb the vibration or gyration caused by an imbalanced platter assembly of the HDD module.

The embodiment may also include a second set of counter-vibration assemblies located at the top of the HDD. These counter-vibration assemblies may be similar to the assemblies that support the HDD from the bottom. Thus, the upper counter-vibration mounting assemblies may include a sphere 620 located between an upper dish 634 surface and a lower dish surface 632. The upper dish 634 may be coupled to the HDD cover 602. The lower dish 632 may be coupled to an upper mounting frame which, in turn, may be coupled to the top of the HDD. In alternative embodiments, the HDD may be coupled to a single mounting frame that provides the upper dish 622 of the lower counter-vibration assemblies and the lower dish 632 of the upper counter-vibration assemblies. Generally, the location and number of top and bottom counter-vibration assemblies may vary.

The upper and lower set of counter-vibration mounting assemblies may provide support to the HDD and absorption of the HDD vibration. Thus, if the HDD housing assembly is turned upside down, the upper set of counter-vibration assemblies may now support the HDD and absorb the vibration or gyration of the HDD module in a similar manner as described above in relation to the bottom set of counter-vibration assemblies. Thus, the HDD device may operate in either the upright orientation or the upside down orientation with the vibration or gyration of the HDD module being absorbed by the counter-vibration assemblies.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A system for mounting at least one storage device, comprising:
   at least one first mounting frame element configured to couple to at least one storage device, the at least one first mounting frame including at least one first mounting frame element depression;
   at least one second mounting frame element that includes at least one second mounting frame element depression that is oriented at least partially facing the at least one first mounting frame element depression;
   at least one separator element that is at least partially enclosed within the at least one first mounting frame element depression and the at least one second mounting frame element depression and supports the at least one first mounting frame element;
   at least one housing that is configured to releasably couple to the at least one second mounting frame element such that the at least one storage device is enclosed within the at least one housing and the at least one second mounting frame element when the at least one housing is coupled to the at least one second mounting frame element;
   at least one third mounting frame element configured to couple to the at least one storage device, the at least one third mounting frame including at least one third mounting frame element depression; and
   at least one second separator element;
   wherein the at least one housing includes at least one housing depression and the at least one second separator element is at least partially enclosed within the at least one third mounting frame element depression and the at least one housing depression.

2. The system of claim 1, wherein the at least one separator element is spherical in shape.

3. The system of claim 1, wherein the at least one second mounting frame element is configured to couple to an apparatus that utilizes the at least one storage device.

4. The system of claim 1, further comprising at least one bumper assembly coupled to an inside surface of the at least one housing, the at least one bumper assembly configured to cushion the at least one storage device from impacting the inside surface of the at least one housing.

5. The system of claim 1, wherein the at least one first mounting frame element is incorporated into at least one storage device.

6. A method for mounting at least one storage device, comprising:
   coupling at least one first mounting frame element to at least one storage device, the at least one first mounting frame including at least one first mounting frame element depression;
   orienting at least one second mounting frame element depression of at least one second mounting frame element at least partially facing the at least one first mounting frame element depression;
   supporting the at least one first mounting frame element by at least partially enclosing at least one separator element in at least one first mounting frame element depression and the at least one second mounting frame element depression;

coupling at least one housing that to the at least one second mounting frame element such that the at least one storage device is enclosed within the housing and the at least one second mounting frame element;

coupling at least one bumper assembly to an inside surface of the housing;

coupling at least one third mounting frame element to the at least one storage device, the at least one third mounting frame including at least one third mounting frame element depression;

configuring at least one housing depression in the at least one housing; and at least partially enclosing at least one second separator element within the at least one third mounting frame element depression and the at least one housing depression.

7. The method of claim 6, further comprising:

causing vibration by operating the at least one storage device; and absorbing at least part of the vibration utilizing the at least one separator element.

8. The method of claim 6, wherein the at least one separator element is spherical in shape.

9. The apparatus of claim 6, further comprising coupling the at least one second mounting frame element to an apparatus that utilizes the at least one storage device.

10. The apparatus of claim 6, further comprising:

causing motion of the at least one storage device by operating the at least one storage device; and cushioning the at least one storage device from impacting the inside surface of the at least one housing due to the motion of the at least one storage device utilizing the at least one bumper assembly.

11. A non-transitory computer-readable medium having sets of instructions stored thereon which, when executed by a computer, cause the computer to:

couple at least one first mounting frame element to at least one storage device, the at least one first mounting frame including at least one first mounting frame element depression;

orient at least one second mounting frame element depression of at least one second mounting frame element at least partially facing the at least one first mounting frame element depression;

support the at least one first mounting frame element by at least partially enclosing at least one separator element in at least one first mounting frame element depression and the at least one second mounting frame element depression;

releasably couple at least one housing to the at least one second mounting frame element such that the at least one storage device is enclosed within the at least one housing and the at least one second mounting frame element when the at least one housing is coupled to the at least one second mounting frame element;

couple at least one third mounting frame element to the at least one storage device, the at least one third mounting frame including at least one third mounting frame element depression; and include at least one second separator element, wherein the at least one housing includes at least one housing depression and the at least one second separator element is at least partially enclosed within the at least one third mounting frame element depression and the at least one housing depression.

* * * * *